April 30, 1929.  E. RILLING  1,711,208
COFFEE MILL
Filed June 27, 1925
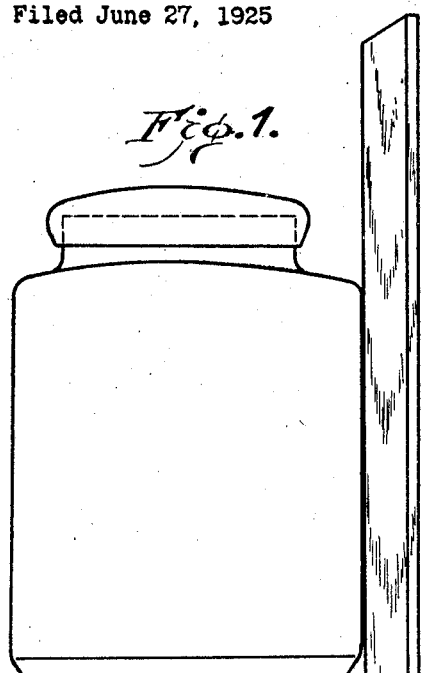
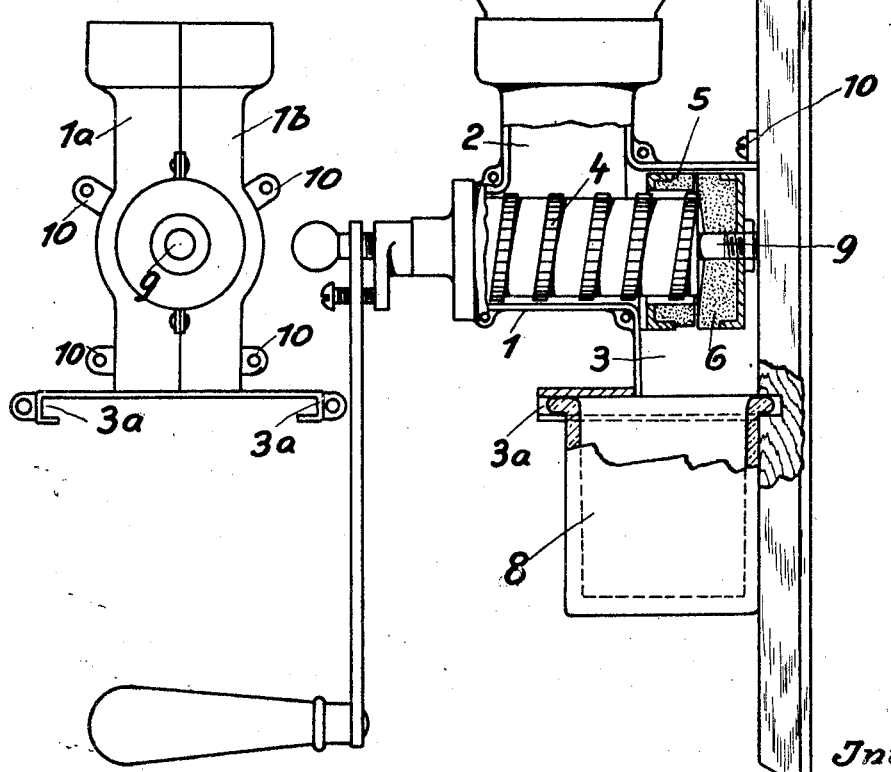

Patented Apr. 30, 1929.

1,711,208

UNITED STATES PATENT OFFICE.

ERNST RILLING, OF DUSSLINGEN, GERMANY.

COFFEE MILL.

Application filed June 27, 1925, Serial No. 39,999, and in Germany June 26, 1924.

This invention relates to a coffee-mill, the novelty residing in the fact, that the coffee, after being preliminarily ground, is fed to a pair of grinding stones, which effect a fine pulverization of the preliminarily ground coffee. The use of artificial grinding stones for finely pulverizing the coffee instead of the grinding by means of iron toothed disks is novel and advantageous in coffee-mills as such iron grinding disks, especially after having become rusty during an extended period of use, are apt to affect the aroma of the coffee very unfavorably. Furthermore by the employment of the artificial grinding stones a greater degree of fineness of the pulverization can be effected, so that the most profitable utilization can be made of the coffee-beans. In the illustrated form of construction of my improved coffee-mill the coffee, which is fed into the mill in vertical direction, is conducted by means of a horizontally arranged conveying screw, which acts at the same time as preliminary grinding roller, to a pair of grinding stones, which effect the fine pulverization of the coffee and then deliver the same in downward direction.

In the accompanying drawing

Fig. 1 is a side view, partly in section of a coffee-mill constructed in accordance with the present invention, and Fig. 2 is a front view of the middle part of the same.

The gear casing 1 consists of two pressed halves 1ª and 1ᵇ, which are connected to each other by rivets or other suitable means, and is secured to the wall-board 11 by screws, which pass through the eyes 10. Within the casing the horizontal shaft 9 is mounted, to which the conveying screw 4 is secured, which acts at the same time as preliminary grinding roller. The coffee is fed from the storage receptacle 7 through the feed pipe 2 of the casing to the screw roller 4 and is conducted by the same towards the right to the grinding stones 5 and 6, while the coffee during said conveying movement is at the same time preliminarily ground. The stationary grinding stone 5 encircles the end of the roller 4, while the rotatable grinding stone 6 is keyed to the shaft 9 at the end of the roller 4. Said rotatable stone 6 cooperates with the rear face of the stationary grinding stone 5, so that the coffee after being finely pulverized between the grinding surfaces of the two stones, drops down through the delivery pipe 3 of the casing into the receptacle 8, which is removably supported in a guide 3ª. The coffee mill is operated in a known manner by means of a hand crank. The grinding stones can be adjusted in regard to each other by axial displacement of the shaft 9 by means of the screw threads provided for this purpose.

I claim:

1. A coffee mill, comprising, in combination means for preliminarily breaking up the coffee-beans supplied to said mill and a plurality of grinding stones for pulverizing the preliminarily ground coffee beans.

2. A coffee mill comprising in combination, a conveying screw adapted to act as a preliminary grinding roller for the coffee beans, and grinding stones adapted to finely grind the coffee beans subsequent to their being preliminarily ground by said conveying screw.

In testimony whereof I affix my signature.

ERNST RILLING.